No. 827,708. PATENTED AUG. 7, 1906.
T. CARTER & J. T. O'SULLIVAN.
CREAM AND MILK COOLER.
APPLICATION FILED JAN. 23, 1906.
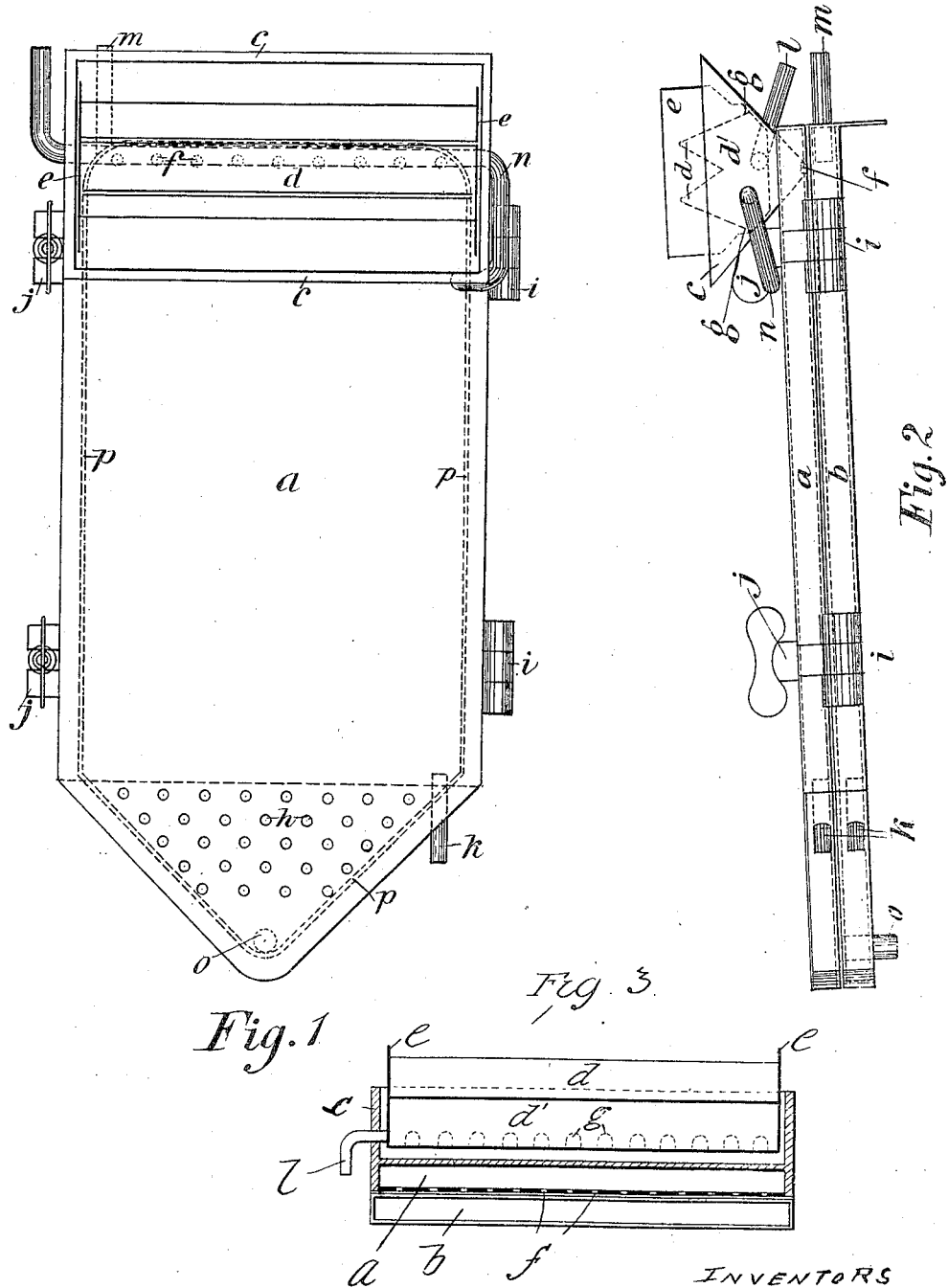
WITNESSES
W. P. Burke
John A. Percival
INVENTORS
Thos Carter
John Timothy O'Sullivan
By Richardson
ATTYS.

UNITED STATES PATENT OFFICE.

THOMAS CARTER, OF MIRBOO NORTH, AND JOHN TIMOTHY O'SULLIVAN, OF NORTH MELBOURNE, VICTORIA, AUSTRALIA.

CREAM AND MILK COOLER.

No. 827,708.     Specification of Letters Patent.     Patented Aug. 7, 1906.

Application filed January 23, 1906. Serial No. 297,508.

*To all whom it may concern:*

Be it known that we, THOMAS CARTER, farmer, residing at Mirboo North, in the county of Buln Buln, and JOHN TIMOTHY O'SULLIVAN, general dealer, residing at 16 Chetwynd street, North Melbourne, in the county of Bourke, in the State of Victoria and Commonwealth of Australia, subjects of the King of Great Britain and Ireland, have invented a certain new and useful Improved Cream and Milk Cooler, of which the following is a specification.

The objects of our invention are the construction of a simple apparatus by the use of which the temperature of milk and cream is greatly lowered.

Our invention relates to an improved apparatus for cooling cream and milk.

In order that our invention may be clearly set forth, reference may be had to the accompanying sheet of drawings, in which—

Figure 1 is a plan of the whole machine, and Fig. 2 a side elevation of the same. Fig. 3 is a longitudinal section at the trough end of Fig. 1.

Similar letters of reference are used to indicate like parts in the different views.

Our said invention consists in two superimposed nearly horizontal flat water-jackets $a$ and $b$, secured together by hinges $i$ on their one side in such manner that they may open apart from each other like a book, and when closed together they are held by clamps $j\ j$ on their other side.

In order to preserve a small space between the water-jackets $a$ and $b$ for the cream or milk to pass between for the purpose of being cooled, thin strips of india-rubber $p\ p$ are inserted in grooves within the edges of the water-jackets $a$ and $b$, and thus make a tight joint when the whole is clamped together. Inlet-pipes $k\ k$ and outlet-pipes $l\ m$ for the cooling-water are provided, and each pair may be connected by flexible tubing to the water-supply pipe in one case and to one outlet-pipe in the other. At the higher end of the top water-jacket $a$ outside is formed a transverse trough $c$, into which is loosely fitted an aerator and cooler $d$, consisting of a closed water-chamber $d'$, running the whole length of the before-mentioned trough. The upper surface of this aerator forms a V-shaped recess, into which the cream falls and overflows the V-shaped sides into the trough $c$, thence passes under the V sides of the aerator $d$, through semicircular openings $g\ g$ on the bottom edges of these V-shaped sides, which project slightly below the bottom plate of the aerator $d$, and thence through the bottom holes $f$ in the underneath side of the top water-jacket $a$, and thus the cream or milk comes into the thin space left between the water-jackets by the intervention of the thin strips of india-rubber $p$. One winged end $e$ of the aerator $d$ is connected by a bent pipe $n$ with the upper water-jacket $a$ at its higher end, and the opposite winged end $e$ of the aerator $d$ is connected by a pipe $l$ with the lower outlet water-pipe $m$ to the outlet-pipe common to both. The lower water-jacket $b$ extends somewhat farther at its lower end than the upper water-jacket $a$ and is brought nearly to a point surrounding a descending vertical pipe $o$, which is the outlet for the cream or milk after passing through the thin space left between the two water-jackets $a$ and $b$, whereby it is cooled. The upper plate of the top water-jacket $a$ is extended to cover this lower part of the lower water-jacket $b$ and is perforated by the holes $h$, so as to admit air to the milk or cream before it passes away by the pipe $o$. The upper plate of the upper water-jacket is provided with a flange all round that part covering the extension of the lower water-jacket, so as to admit of a tight joint being made round the space occupied by the milk or cream while admitting air through the holes $h$ to the cream. The upper water-jacket $a$ may, if necessary, have another series of holes at its higher end to admit air to the thin space left between the water-jackets $a$ and $b$. These holes are fitted with short pipes passing through the water-jacket to the thin space occupied by the cream.

The operation is as follows: The two water-jackets $a$ and $b$ being clamped together and the water-inlet pipes $k$ being connected with an overhead water-supply and the outlet-pipes $l\ m$ connected with the main outlet, cream or milk is allowed to fall into the upper surface of the aerator $d$ when it overflows the before-mentioned V sides into the trough $c$, thence through the spaces $g\ g$ at the bottom edges of these sides, and thus to the bottom of the trough $c$, thence through the holes $f$ to the thin space left between the two water-jackets $a$ and $b$, where it is cooled, and then passes out by the pipe o, first meeting with air through the holes h in the upper plate of the upper water-jacket a. The cooling-water in the water-jackets a and b flows from the lower to the upper end by means of a head of water and flows always the reverse way to the cream or milk.

Having now described our invention, what we claim as new, and desire to secure by Letters Patent, is—

1. In an improved cream and milk cooler, an aerator d, formed with V-shaped sides, having semicircular openings on their lower edges, and comprising a water-chamber d', substantially as herein set forth and described and illustrated by the accompanying drawings.

2. In a cooler for milk and the like, an aerator d adapted to contain water and having a V-shaped trough in its top.

3. In a cooler for milk and the like, a V-shaped trough having perforations in its bottom and an aerator fitting in said trough, said aerator having V-shaped lower sides having semicircular recesses therein, and inclined upper sides and a V-shaped trough in its top, said aerator having a water-chamber therein.

4. In a cooler for milk and the like, two water-jackets a and b having a space between them means for introducing the milk into said space at one end of the jackets and means for introducing water into both jackets at the other end.

5. A cooler comprising two water-jackets having a space between them, a trough in communication with said space at one end, an aerator in said trough, a pipe leading from the interior of one water-jacket to said aerator and means for introducing water into both water-jackets at the end opposite to that where the milk is introduced.

In testimony whereof we have signed our names to this specification in the presence of two subscribing witnesses.

THOMAS CARTER.
JOHN TIMOTHY O'SULLIVAN.

Witnesses:
WM. CONYERS,
THOMAS ARTHUR DENNIS.